(12) United States Patent
Popp et al.

(10) Patent No.: US 7,876,985 B2
(45) Date of Patent: Jan. 25, 2011

(54) OPTICAL ROTATING DATA TRANSMISSION DEVICE OF SHORT OVERALL LENGTH

(75) Inventors: Gregor Popp, Munich (DE); Max Winkler, Germering (DE)

(73) Assignee: Schleifring und Apparatebau GmbH, Fuerstenfeldbruck (DE)

( * ) Notice: Subject to any disclaimer, the term of this patent is extended or adjusted under 35 U.S.C. 154(b) by 0 days.

(21) Appl. No.: 12/144,106

(22) Filed: Jun. 23, 2008

(65) Prior Publication Data

US 2008/0317407 A1 Dec. 25, 2008

(30) Foreign Application Priority Data

Jun. 25, 2007 (DE) .................. 10 2007 029 503

(51) Int. Cl.
*G02B 6/26* (2006.01)

(52) U.S. Cl. .................. 385/25; 385/26; 385/33; 385/34; 385/35; 385/36; 385/39

(58) Field of Classification Search .......... 385/25–26, 385/33–36, 39
See application file for complete search history.

(56) References Cited

U.S. PATENT DOCUMENTS

| | | | |
|---|---|---|---|
| 4,109,998 A | | 8/1978 | Iverson |
| 4,325,584 A | | 4/1982 | Christ et al. |
| 4,398,791 A | * | 8/1983 | Dorsey .................. 385/26 |
| 4,641,915 A | | 2/1987 | Asakawa et al. |
| 4,725,116 A | * | 2/1988 | Spencer et al. .......... 385/26 |
| 4,858,292 A | | 8/1989 | Buhlmann et al. |
| 4,872,737 A | * | 10/1989 | Fukahori et al. .......... 385/25 |
| 4,875,756 A | * | 10/1989 | Estes et al. ............ 398/114 |
| 5,039,193 A | * | 8/1991 | Snow et al. ............ 385/25 |
| 5,073,040 A | | 12/1991 | Guinard |
| 5,115,481 A | | 5/1992 | Buhrer |
| 5,157,745 A | * | 10/1992 | Ames ................. 385/26 |

(Continued)

FOREIGN PATENT DOCUMENTS

AT    410603    6/2003

(Continued)

OTHER PUBLICATIONS

Hecht, Optik, © 1974 Addison-Wesley Publishing, 8 pages.

(Continued)

*Primary Examiner*—Brian M. Healy
*Assistant Examiner*—Guy G Anderson
(74) *Attorney, Agent, or Firm*—Kevin L. Daffer; Daffer McDaniel, LLP (57) ABSTRACT

An optical rotating data transmission device comprises a first collimator arrangement for coupling-on first optical waveguides, a second collimator arrangement for coupling-on second optical waveguides, which is supported to be rotatable relative to the first collimator arrangement about a rotation axis, and a derotating element such as a Dove prism in a light path between the collimator arrangements. At least one collimator arrangement comprises a deflecting element which deflects light entering the device from optical waveguides positioned at an angle to the direction of the rotation axis to travel along the direction of the rotation axis, or deflects light traveling along the direction of the rotation axis to exit the device at an angle to the rotation axis towards optical waveguides.

13 Claims, 6 Drawing Sheets

U.S. PATENT DOCUMENTS

| | | | |
|---|---|---|---|
| 5,271,076 A | 12/1993 | Ames | |
| 5,317,659 A | 5/1994 | Lee | |
| 5,442,721 A | 8/1995 | Ames | |
| 5,568,578 A * | 10/1996 | Ames | 385/34 |
| 5,588,077 A | 12/1996 | Woodside | |
| 6,192,175 B1 | 2/2001 | Li et al. | |
| 6,236,787 B1 | 5/2001 | Laughlin | |
| 6,263,133 B1 | 7/2001 | Hamm | |
| 6,360,032 B1 | 3/2002 | Berger et al. | |
| 6,441,960 B1 | 8/2002 | Wang et al. | |
| 6,782,160 B2 | 8/2004 | Townsend et al. | |
| 6,823,142 B1 | 11/2004 | Tanaka et al. | |
| 6,862,383 B2 | 3/2005 | Kikuchi et al. | |
| 7,076,131 B2 | 7/2006 | Bolle | |
| 7,142,747 B2 * | 11/2006 | Oosterhuis et al. | 385/26 |
| 7,239,776 B2 * | 7/2007 | Oosterhuis et al. | 385/25 |
| 7,246,949 B2 * | 7/2007 | Thiele et al. | 385/54 |
| 7,298,538 B2 | 11/2007 | Guynn et al. | |
| 7,352,929 B2 | 4/2008 | Hagen et al. | |
| 7,372,230 B2 * | 5/2008 | McKay | 318/568.2 |
| 7,373,041 B2 | 5/2008 | Popp | |
| 7,433,556 B1 | 10/2008 | Popp | |
| 2002/0094163 A1 | 7/2002 | Ooyama et al. | |
| 2003/0099454 A1 | 5/2003 | Chang | |
| 2004/0017984 A1 | 1/2004 | Thiele et al. | |
| 2005/0036735 A1 | 2/2005 | Oosterhuis et al. | |
| 2005/0119529 A1 | 6/2005 | Farr et al. | |
| 2006/0110092 A1 | 5/2006 | Ikeda | |
| 2007/0019908 A1 | 1/2007 | O'Brien et al. | |
| 2007/0053632 A1 | 3/2007 | Popp | |
| 2007/0237528 A1 | 10/2007 | Popp | |
| 2008/0106711 A1 | 5/2008 | Beierl et al. | |
| 2008/0175535 A1 | 7/2008 | Popp et al. | |
| 2008/0226231 A1 | 9/2008 | Popp | |

FOREIGN PATENT DOCUMENTS

| | | |
|---|---|---|
| DE | 1300002 | 7/1969 |
| DE | 1575515 | 3/1970 |
| DE | 74062 | 6/1970 |
| DE | 1772492 | 2/1972 |
| DE | 3207469 | 9/1982 |
| DE | 19809823 | 9/1999 |
| DE | 20105786 | 7/2001 |
| DE | 69704782 | 11/2001 |
| DE | 69704783 | 11/2001 |
| DE | 10029206 | 1/2002 |
| DE | 10029209 | 1/2002 |
| DE | 102004026498 | 12/2005 |
| DE | 60019966 | 2/2006 |
| DE | 102006022023 | 11/2006 |
| DE | 102005056899 | 5/2007 |
| EP | 0490054 | 6/1992 |
| EP | 0588039 | 3/1994 |
| EP | 1345051 | 9/2003 |
| EP | 1359452 | 11/2003 |
| EP | 1476969 | 1/2005 |
| GB | 2005044 | 4/1979 |
| JP | 63208821 | 8/1988 |
| JP | 2113213 | 4/1990 |
| JP | 2141708 | 5/1990 |
| WO | 01/98801 | 12/2001 |
| WO | 03/069392 | 8/2003 |

OTHER PUBLICATIONS

Schleifring, "Mikrooptischer Dreguebertrager," 2005, 12 pages.
U.S. Appl. No. 11/962,333, filed Dec. 21, 2007.
Office Action mailed Jul. 8, 2008 for U.S. Appl. No. 12/045,965.
Final Office Action mailed Mar. 16, 2009 for U.S. Appl. No. 12/045,965.
Office Action mailed Apr. 5, 2007 for U.S. Appl. No. 11/469,004.
Notice of Allowance mailed Oct. 10, 2007 for U.S. Appl. No. 11/469,004.
Notice of Allowance mailed Jan. 7, 2008 for U.S. Appl. No. 11/469,004.
Office Action mailed Feb. 22, 2008 for U.S. Appl. No. 11/766,361.
Notice of Allowance mailed Jul. 14, 2008 for U.S. Appl. No. 11/766,361.
Office Action mailed Aug. 28, 2009 for U.S. Appl. No. 12/045,965.
Office Action Mailed Oct. 20, 2009 for U.S. Appl. No. 11/563,371.
Notice of Allowance mailed Jan. 12, 2010 for U.S. Appl. No. 12/045,965.
Notice of Allowance mailed Jan. 26, 2010 for U.S. Appl. No. 11/563,371.
Office Action mailed Oct. 18, 2010 for U.S. Appl. No. 11/962,333.

* cited by examiner

OPTICAL ROTATING DATA TRANSMISSION DEVICE OF SHORT OVERALL LENGTH

CROSS REFERENCE TO RELATED APPLICATIONS

The present application claims priority to pending German Patent Application No. 102007029503.2 filed Jun. 25, 2007, and incorporated herein by reference.

BACKGROUND OF THE INVENTION

1. Field of the Invention

The invention relates to a device for transmitting optical signals between units that are rotatable relative to each other, which device is also known as a rotary coupling or a rotary joint. With this, preferably a plurality of optical signals can be transmitted simultaneously in a plurality of channels.

2. Description of the Related Art

Various transmission systems are known for transmitting optical signals between units that are rotatable relative to each other.

U.S. Pat. No. 5,568,578 discloses an optical rotating data transmission device for a plurality of channels, with a Dove prism. For coupling light into or out of glass fibers, an arrangement with a plurality of GRIN lenses is provided. The GRIN lenses and glass fibers connected thereto extend along a longitudinal direction of the arrangement. Therefore a rotating optical data transmission device of this kind will have a relatively long overall length.

Another kind of an optical rotating data transmission device is disclosed in WO 01/98801. This sets out a micro-optical system having optical and mechanical parts as a one-piece component. The arrangement allows an achievement of a substantially higher packing density of individual glass fibers. The disadvantage of this system is also the long overall length.

BRIEF SUMMARY OF THE INVENTION

The invention is based on the object of improving the known state of the art of rotating data transmission devices for transmitting optical signals, and to develop it specifically so that the overall length of the arrangement is reduced.

In accordance with the invention, this object is achieved by an optical rotating data transmission device, comprising: at least one first collimator arrangement for coupling-on a first set of optical waveguides at a first coupling-on location; a second collimator arrangement for coupling-on a second set of optical waveguides at a second coupling-on location, the second collimator arrangement being supported to be rotatable relative to the first collimator arrangement about a rotation axis extending along a longitudinal direction of the rotating data transmission device; a derotating optical element located in a light path between the first collimator arrangement and the second collimator arrangement; wherein at its respective coupling-on location, at least one of the first set and the second set of optical waveguides is coupled on to the first or second collimator arrangement, respectively, at an angle to the longitudinal direction of the rotation axis; and wherein the collimator arrangement having the set of optical waveguides coupled-on at an angle to the longitudinal direction of the rotation axis comprises an optical deflecting element which deflects light received from the coupled-on set of optical waveguides along a direction parallel to the rotation axis and towards the derotating element, or deflects light received from the derotating element along a direction parallel to the rotation axis towards the optical waveguides coupled-on at the angle to the direction of the rotation axis.

In accordance with the invention, the above object is also achieved by a collimator arrangement for optical rotation data transmission devices, comprising at least one of a beam-guiding and a beam-shaping element, wherein a deflecting element is provided for deflecting light entering the collimator arrangement at a predetermined angle.

In accordance with the invention, the above object is also achieved by an optical rotating data transmission device, comprising: a first collimator arrangement for coupling-on a first optical waveguide at a first coupling-on location; a second collimator arrangement for coupling-on a second optical waveguide at a second coupling-on location, the second collimator arrangement being supported to be rotatable relative to the first collimator arrangement about a rotation axis extending along a longitudinal direction of the rotating data transmission device; a light path between the first collimator arrangement and the second collimator arrangement; wherein at its respective coupling-on location, at least one of the first and the second optical waveguides is coupled-on to the first or second collimator arrangement, respectively, at an angle to the rotation axis; and wherein the collimator arrangement having an optical waveguide coupled-on at an angle to the rotation axis comprises an optical deflecting element which deflects light received from the coupled-on optical waveguide along the rotation axis, or deflects light received along the rotation axis towards the optical waveguides coupled-on at the angle to the rotation axis.

In accordance with the invention, the above object is also achieved by an optical rotating data transmission device, comprising: a first collimator arrangement for coupling-on a first optical waveguide at a first coupling-on location; a second collimator arrangement for coupling-on a second optical waveguide at a second coupling-on location, the second collimator arrangement being supported to be rotatable relative to the first collimator arrangement about a rotation axis extending along a longitudinal direction of the rotating data transmission device; a light path between the first collimator arrangement and the second collimator arrangement; wherein at its respective coupling-on location, the first optical waveguide is coupled-on to the first collimator arrangement at an angle to the longitudinal direction of the rotation axis; and wherein the first collimator arrangement comprises an optical deflecting element which deflects light received from the first optical waveguide along the rotation axis, or deflects light received along the rotation axis towards the first optical waveguide.

BRIEF DESCRIPTION OF THE DRAWINGS

The invention is described below by way of example, without limitation of the general inventive concept, on embodiments and with reference to the drawings.

DETAILED DESCRIPTION OF PREFERRED EMBODIMENTS

Figure 1:
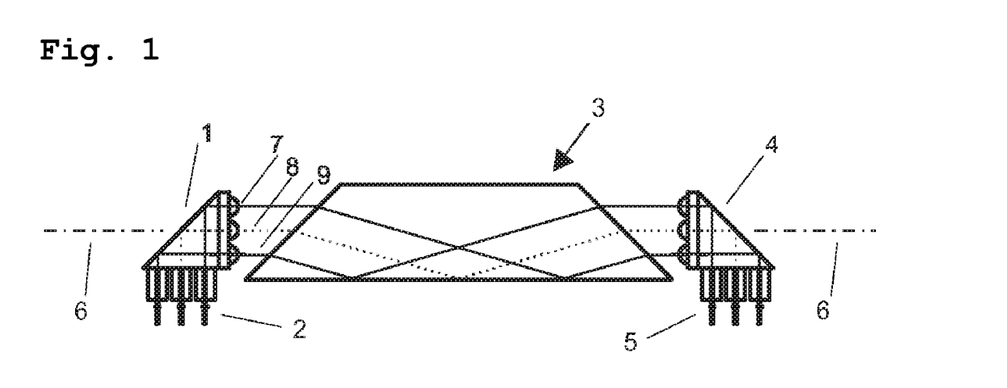
FIG. 1 schematically shows in general form an arrangement in accordance with the invention.

FIG. 1 shows in schematic form a cross-section through an arrangement in accordance with the invention along a rotation axis 6. The optical rotating data transmission device in accordance with the invention comprises a first collimator arrangement 1 for coupling-on a first set of optical waveguides 2, and also a second collimator arrangement 4 for coupling-on a second set of optical waveguides 5. A derotating optical element 3, which in this case is a Dove prism, is disposed between the first collimator arrangement 1 and the second collimator arrangement 4. A beam path of three light rays 7, 8, 9 illustrates the way the arrangement works. Light can therefore be coupled-in, for example, through one of the first optical waveguides 2 perpendicularly to the rotation axis. The light is deflected and collimated in the first collimator arrangement 1 in a direction parallel to the rotation axis, derotated with the Dove prism 3, and coupled into the second collimator arrangement 4. There beam guiding and shaping is again effected for coupling into the second set of optical waveguides 4 which is arranged again perpendicularly to the rotation axis.

Figure 2:
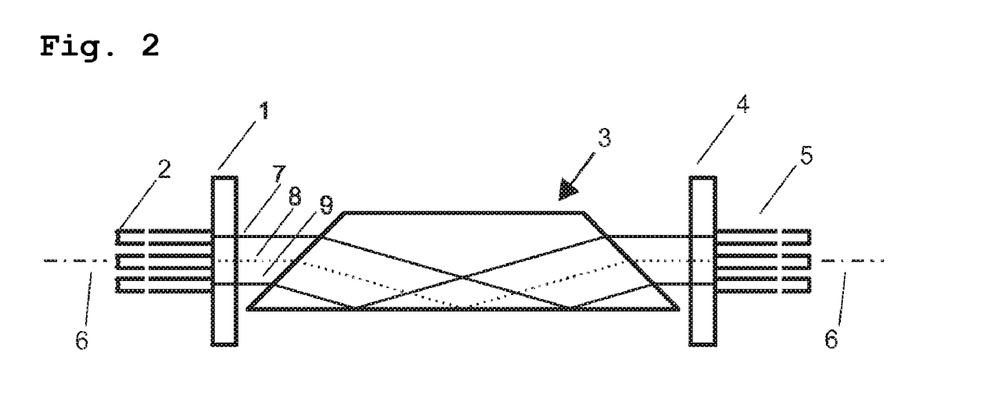
FIG. 2 shows an example of an arrangement according to the state of the art.

FIG. 2 schematically shows an arrangement according to the state of the art. The optical rotating data transmission device comprises a first collimator arrangement 1 for coupling-on first optical waveguides 2, and a second collimator arrangement 4 for coupling-on second optical waveguides 5. The second collimator arrangement 4 is supported to be rotatable about the rotation axis 6 relative to the first collimator arrangement 1. For compensating the rotary motion, a derotating element in the form of a Dove prism 3 is located in the beam path between the first collimator arrangement 1 and the second collimator arrangement 4. The exemplary beam path of three light rays 7, 8, 9 is shown to start from a first set of optical waveguides 2 and to pass via the first collimator arrangement 1 through the Dove prism 3, and via the second collimator arrangement 4 up to and into the second optical waveguide 5.

Figure 3:
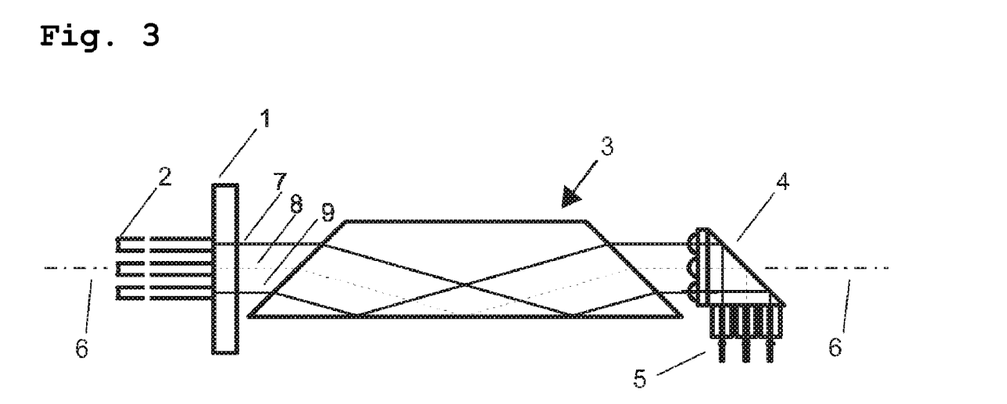
FIG. 3 shows a further embodiment of an arrangement in accordance with the invention.

FIG. 3 shows a further variant of an arrangement in accordance with the invention. In this case, the first collimator arrangement 1 is a collimator arrangement with a straight beam path. The second collimator arrangement 4 has a beam path which is deflected by 90° relative to the rotation axis 6.

Figure 4:
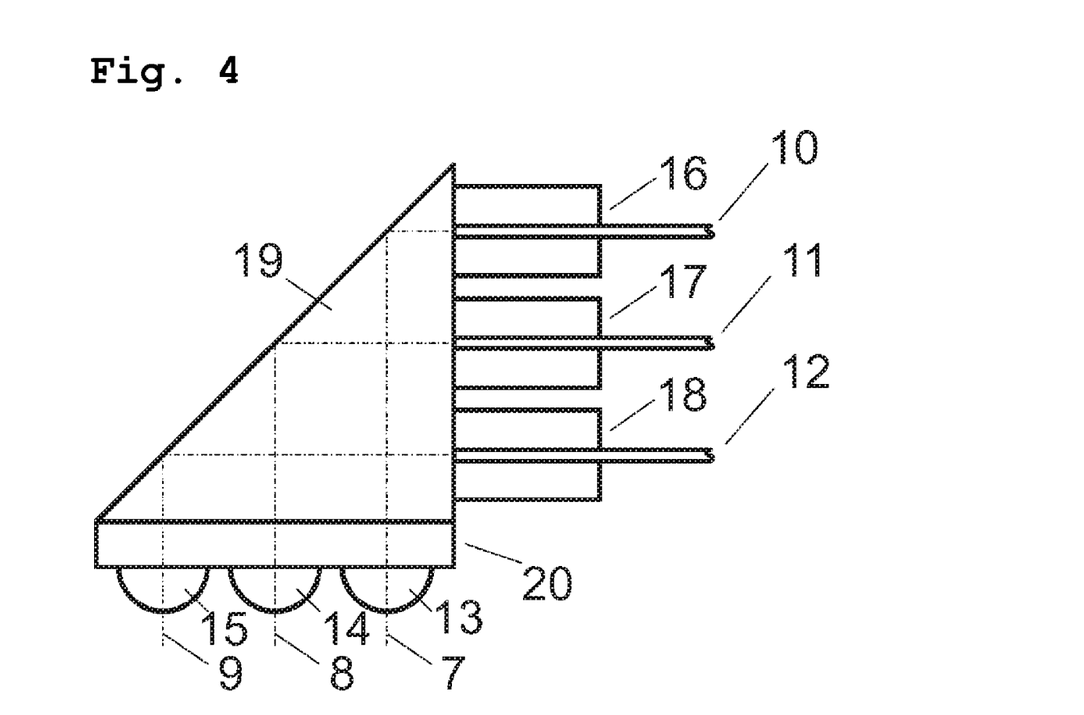
FIG. 4 shows in schematic form a collimator arrangement in accordance with the invention.

FIG. 4 shows in schematic form a collimator arrangement in accordance with the invention. The function is explained for the case of coupling-in light in the direction of the derotating optical element. Basically, an operation in a reverse direction is also possible. Light is transmitted into the arrangement via the first optical waveguides 10, second optical waveguides 11, and third optical waveguides 12, which are shown here by way of example. The optical waveguides 10, 11, 12 are accommodated in ferrules 16, 17, 18 and preferably fastened with the same to a deflecting element 19. The deflecting element deflects the light rays 7, 8, 9 from the optical waveguides 10, 11, 12 through 90°, so that they travel parallel to the rotation axis 6 of the rotating data transmission device. Finally, a micro-lens array 20 with lenses 13, 14 and 15 is further attached to the deflecting element 19. These lenses are used for beam focusing along the direction of the Dove prism.

Figure 5:
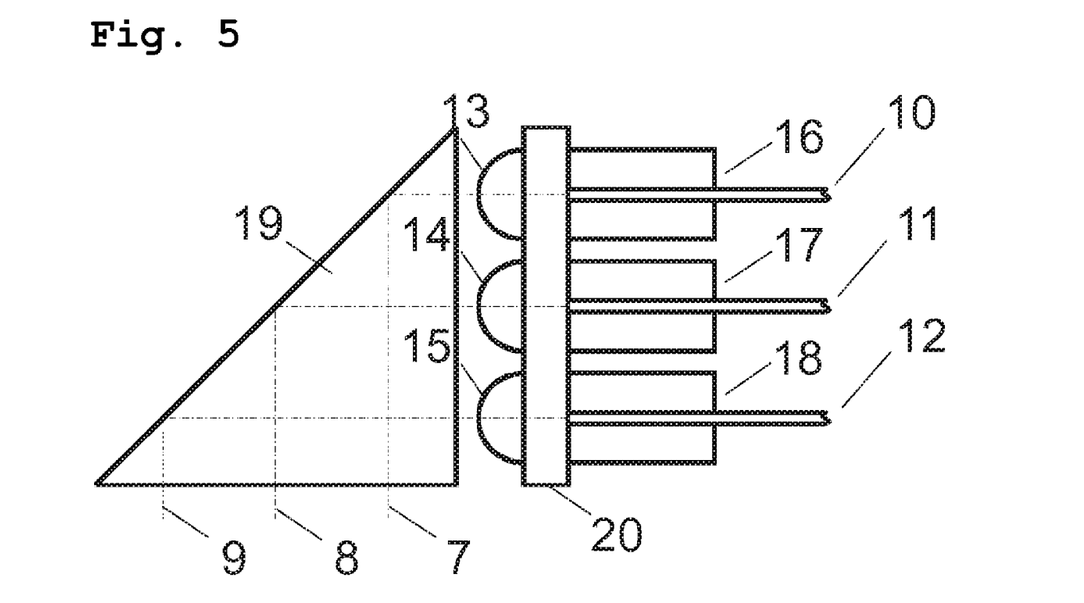
FIG. 5 shows in schematic form a further arrangement in accordance with the invention.

FIG. 5 schematically shows a further arrangement in accordance with the invention. The principal arrangement is similar to the one shown in FIG. 4. However, in the arrangement shown in FIG. 5, the micro-lens array 20 is attached to the other side of the deflecting element 19. Advantageously the ferrules 16, 17, 18 are fastened to the support of the micro-lens array.

Figure 6:
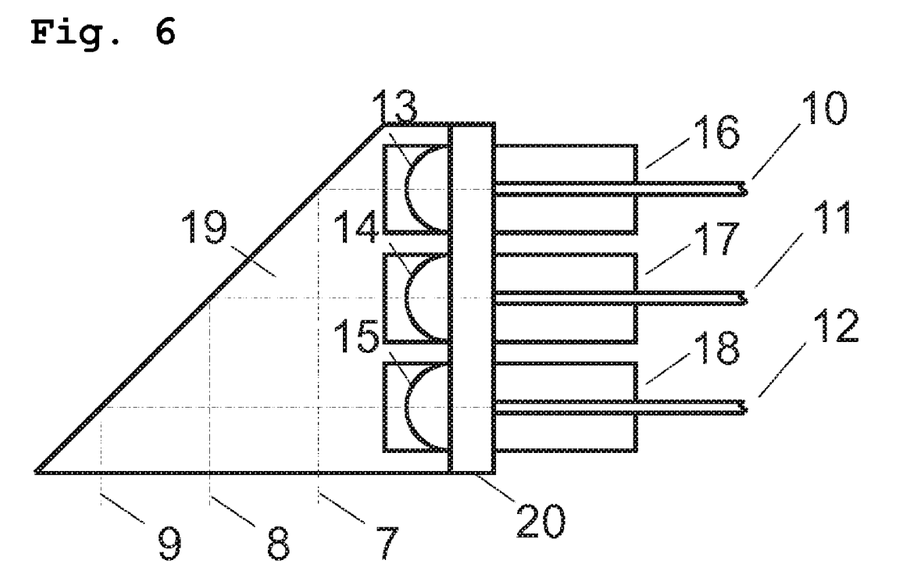
FIG. 6 shows a further embodiment of an arrangement in accordance with the invention.

FIG. 6 shows a further embodiment of an arrangement in accordance with the invention as shown in FIG. 4. Here the deflecting element 19 rests with plane surface contact on the micro-lens array 20. Hollow spaces for accommodating the lenses are provided in front of the individual lenses. These can be filled also with another medium than air, such as a liquid or a solid material having a suitable refractive index.

Figure 7:
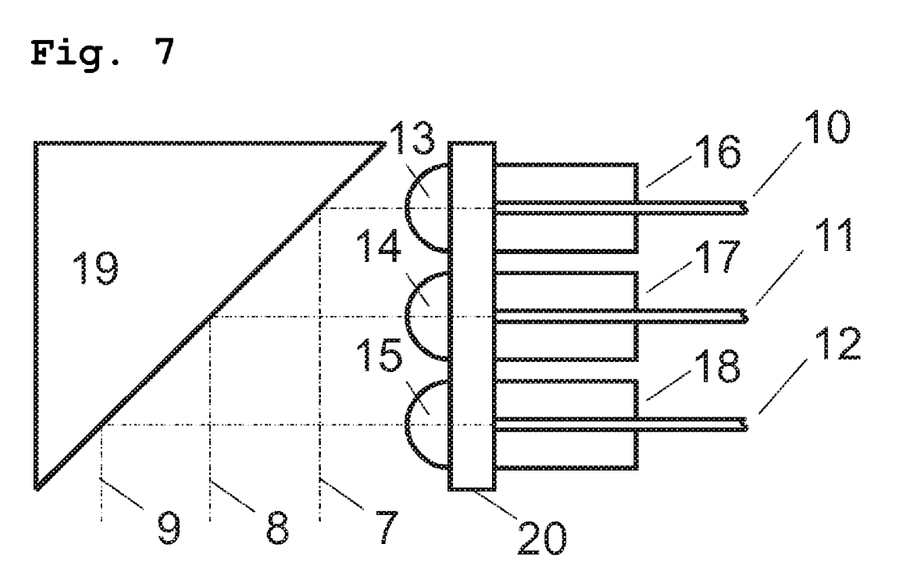
FIG. 7 shows a further modification of the embodiment according to FIG. 4.

FIG. 7 shows a further modification of the embodiment according to FIG. 4. In this case, the deflecting element is not a prism but a front-surface mirror. A simple plane mirror also can be used instead of the prism-shaped mirror support as shown here.

Figure 8:
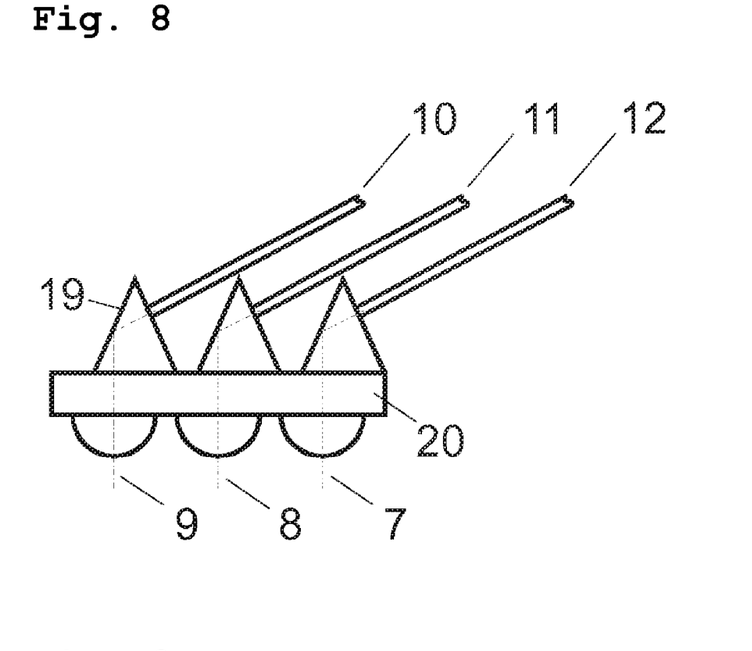
FIG. 8 shows a further embodiment in which a deflecting element consists of a plurality of individual parts.

FIG. 8 shows a further advantageous embodiment of the invention. Here the deflecting element 19 consists of individual parts which here are also prism-shaped. These parts are attached to the plane rear side of the micro-lens array 20.

Figure 9:
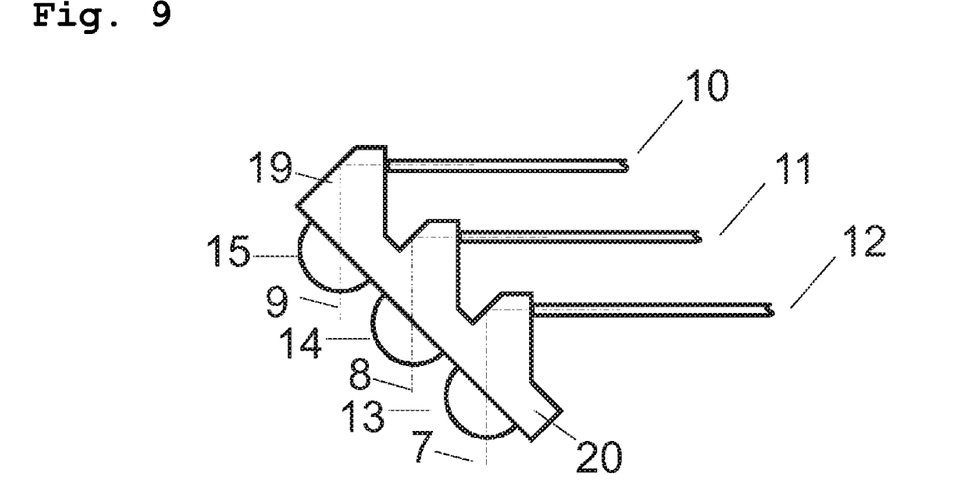
FIG. 9 shows an embodiment in which the deflecting element is incorporated in the micro-lens array.

FIG. 9 shows a further embodiment of the invention in which the deflecting element is incorporated in the micro-lens array. This leads to an especially simple configuration of the entire arrangement. Furthermore, it is here shown that the base of the micro-lens array can be also positioned to be inclined, with the light rays then intersecting the individual lenses whilst being displaced from the central axes that are perpendicular to the micro-lens array.

Figure 10:
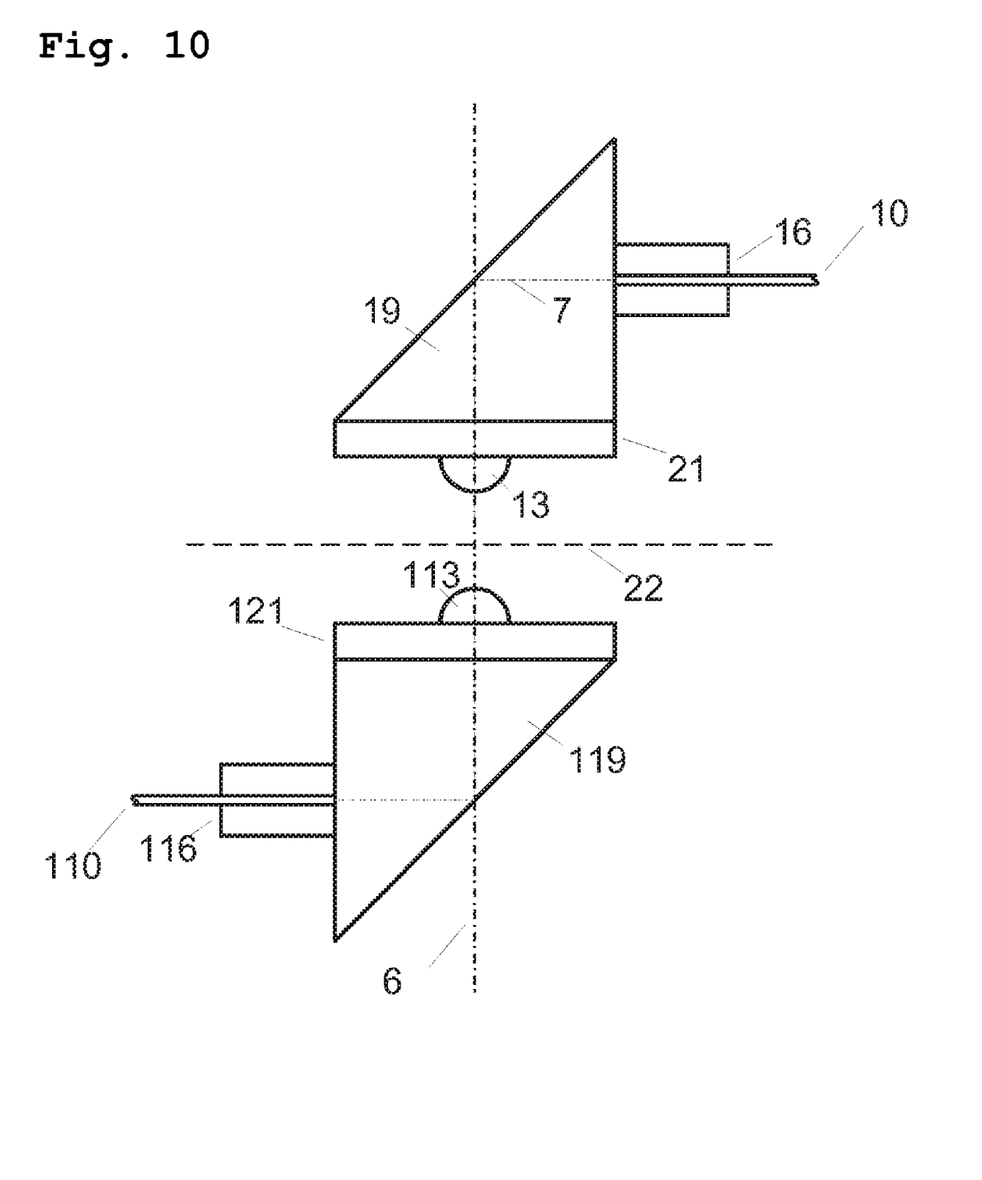
FIG. 10 shows an embodiment of the invention with a transmission channel.

FIG. 10 shows a further embodiment of the invention, in which only one single channel is provided. In this case, it is possible to omit the derotating optical element 3 between the two collimator arrangements. For illustration purposes, the rotation gap 22 also is shown in addition to the rotation axis 6. The optical components on each side of the rotation gap are rigidly connected with each other. Thus, an arrangement consisting of a lens 13 on a lens support 21 is located on a first side of the rotation gap 22 (at the top of the illustration). Basically, in this case a lens support of this kind also can be a micro-lens array. Furthermore, a deflecting element 19 is provided which is preferably rigidly connected with the lens support 21. Moreover, a first optical waveguide 10 and preferably a first ferrule 16 for its fastening are connected with the deflecting element 19. On the other side of the rotation gap 22, a lens 113 is located on a lens support 121 which could be also a micro-lens array. Furthermore, this also is connected with a deflecting element 119 and also an optical waveguide 110 and a ferrule 116.

Figure 11:
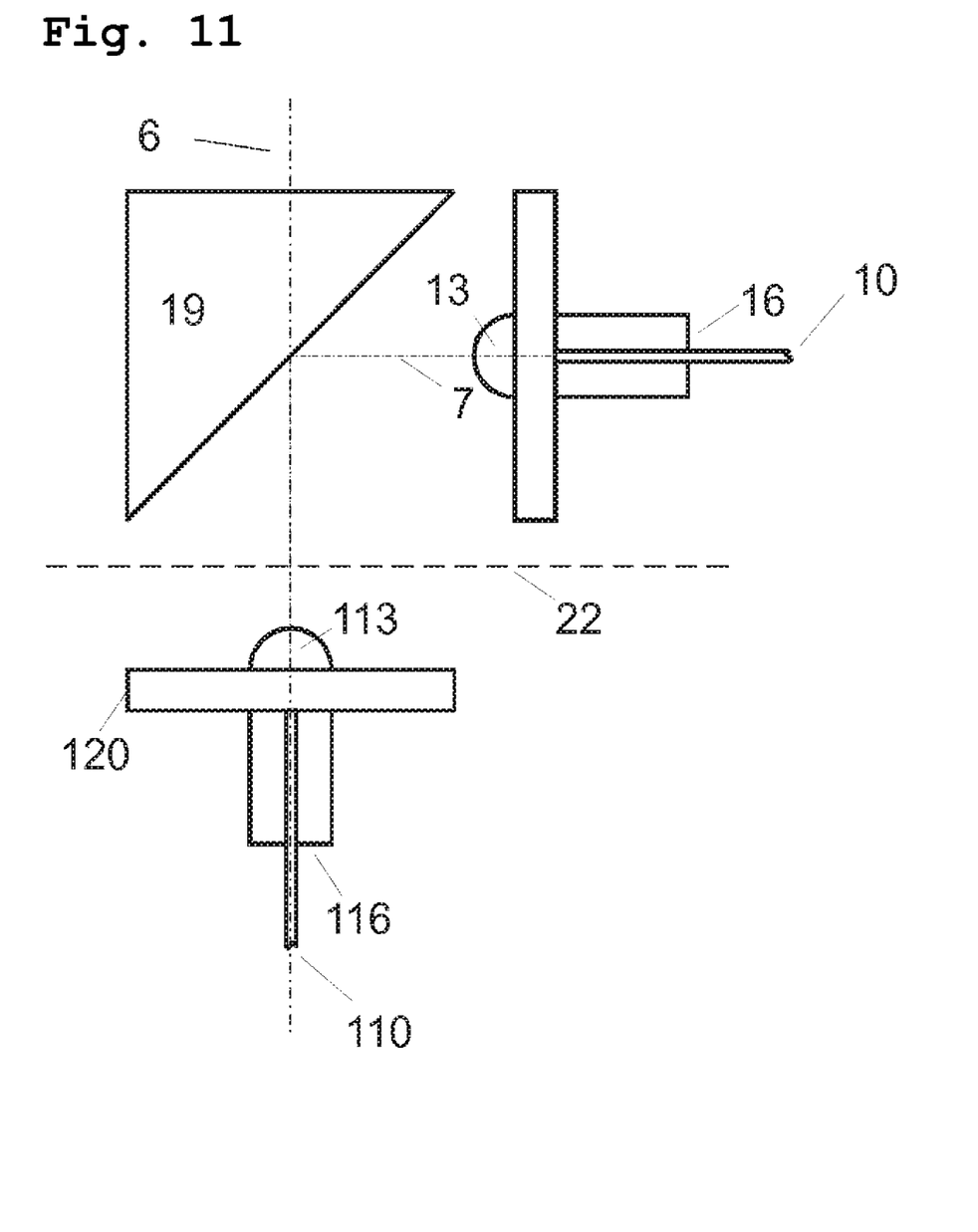
FIG. 11 shows an embodiment of the invention with a transmission channel and only one collimator arrangement having a deflecting element.

FIG. 11 shows another embodiment with a single channel. In this case, only the upper collimator arrangement above the rotary gap 22 is provided with a deflecting element 19. The arrangement above the rotary gap 22 corresponds in its essential technical features to that of the preceding Figure. Basically, any of the previously described collimator arrangements with deflection of direction can be used in all embodiments of a collimator arrangement, as shown here, which deflect a light ray incident at a inclination to the rotation axis along the direction of the rotation axis. The bottom collimator arrangement in this Figure below the rotary gap 22 does not require any deflecting element. However, if required, it also could be provided with such a deflecting element. The lens 113 is attached to a lens support 120, but also can be provided as a component of a micro-lens array, or also as a discrete lens such as a GRIN lens, for example. In rotating data transmission devices of this kind, the components on the first side of the rotation gap are always rotatably supported opposite to the components on the second side of the rotation gap. The components on the first side of the rotation gap, especially the deflecting element 19 and the first lens 13, and also the first optical waveguide 10, are rigidly connected to each other. Similarly, the components on the second side of the rotation gap, especially the lens 113 and also the optical waveguide 110, are rigidly connected to each other.

The device in accordance with the invention comprises two collimator arrangements 1, 4 which are arranged to be rotatable relative to each other about a rotation axis 6. There is an optical path for the transmission of light between the first collimator arrangement 1 and the second collimator arrangement 4 disposed to be rotatable relative to the first. At least one derotating element such as a Dove prism 3 is located in this optical path to ensure an imaging of the light emitted by the first collimator arrangement 1 onto the second collimator arrangement 4, and also in the opposite direction, irrespective of the rotational movement between the two collimators. The Dove prism is rotated for this purpose at one-half of the angular velocity of the rotation of the first collimator arrangement 1 and the second collimator arrangement 4.

Each of the collimator arrangements 1, 4 comprises at least one collimator and at least one means for supporting the at least one collimator. The term "collimator" is here used in a widest sense for a beam-guiding or beam-shaping element. The purpose of a collimator of this kind is the conversion of the light guided in an optical waveguide such as a single-mode fiber, or also a multi-mode fiber, to form a beam path which can be passed through the rotating data transmission device and especially through the derotating element. This corresponds to a beam path in free space or in an optical medium such as glass or oil. Similarly, a conversion in the opposite direction can be effected with a collimator, i.e., from a beam path in the rotating data transmission device into an optical waveguide. Of course, conversions within a collimator are conceivable in both directions, so that bidirectional signals can be transmitted. Typically, the collimators are lenses, preferably gradient-index lenses (GRIN lenses), with lenses of a micro-lens array being most preferred. A collimator arrangement can be designed for any desired number of optical channels. In the simplest of cases it is designed for a single channel, preferably however for a number of channels which is larger than two. Accordingly, the terms of the first set of optical waveguides 2 and the second set of optical waveguides 5 relates to at least one, preferably a plurality of optical waveguides.

Principally, the invention can be put into practice for all derotating optical elements. For sake of clarity, reference is here made to a Dove prism. However, an Abbe-Koenig prism also can be used as a derotating element.

A collimator arrangement in accordance with the invention comprises also at least one deflecting element 19 in addition to means for beam guiding and beam shaping. This deflecting element deflects light rays, entering the collimator arrangement, through a predetermined angle. A preferred angle is 90°. Angles within a range of 30° to 150° can be used appropriately. With the deflecting element, optical waveguides can be disposed at a non-zero inclination to the rotation axis 6. The light coupled-in by these optical waveguides obliquely to the rotation axis is deflected by the deflecting element in such a way that it can be further guided and transmitted parallel to the rotation axis. The same applies to light approaching parallel to the rotation axis. This is deflected by a deflecting element in such a way that it can be coupled into optical waveguides disposed to be inclined to the rotation axis. The optical waveguides no longer need to be disposed parallel to the rotation axis. The inclined arrangement leads to a lower need for space of the entire arrangement in the direction of rotation axis 6. In accordance with the state of the art, the optical waveguides extend along the direction of the rotation axis. Optical waveguides cannot be bent sideways sharply. It is necessary to take the minimal bending radii into account. Thus, an additional extension results. A solution is provided by an arrangement in accordance with the invention. Furthermore, an incorporation into a complex rotating data transmission system also can be simplified. The deflecting element 19 is rigidly connected with a set of optical waveguides, i.e. the waveguides 10, 11, 12, and also the lenses 13, 14, 15.

Further subject matter of the invention is a collimator arrangement for use in optical rotating data transmission devices.

Preferably, all optical waveguides of the first set of optical waveguides are disposed to be parallel to each other. It is advantageous when also all optical waveguides of the second set of optical waveguides are disposed to be parallel to each other.

By choosing a favorable angle between light entrance and exit of a collimator arrangement, the lateral spacing of the optical waveguides or the ferrules can be optimized. This spacing could be chosen in such a way, for example, that all ferrules can be mounted to be closely adjacent to each another in a dense package.

In an especially advantageous embodiment of the invention, the deflecting element is a prism-shaped glass body, with the optical waveguides 10, 11, 12 being attached to one of the two surfaces that are perpendicular to each other. The attachment can be effected by means of welding or splicing, for example. It also can be effected by means of ferrules 16, 17, 18. Alternatively, attachment with an adhesive is also possible. The fiber can be fixed with a holding device, for example, until the adhesive has cured, in order to maintain precisely the position and the angle. Lenses 13, 14, 15 are provided preferably as components of a micro-lens array 20 on the other of the two faces that are perpendicular to each other. An especially simple mounting of the arrangement is obtained particularly at the end of a micro-lens array. Light entering through the optical waveguides is now refracted at the third side of the prism-shaped glass body and deflected in the direction of the lenses. Following focusing by the lenses, the light leaves the collimator arrangement in the direction of the derotating optical element.

In a further embodiment of the invention, the lenses 13, 14, 15 are a component part of a micro-lens array. The ferrules 16, 17, 18 are attached to the plane rear side of the micro-lens array. Thus the ferrules including the fibers form a unit together with the micro-lens array. The deflecting element 19 can be disposed behind the lenses of this unit.

In a further embodiment in accordance with the invention, recesses for accommodating the lenses are additionally located in the deflecting element. Thus, bearing faces of the deflecting element 19 can rest on the micro-lens array 20 laterally of the lenses. This leads to an arrangement that is easy to mount and mechanically stable. Owing to the recesses, hollow spaces are formed around the lenses in a mounted unit. The hollow spaces can be filled with a gas, a liquid, a solid or any other optically suitable medium.

In a further embodiment of the invention, a deflecting mirror or a front-surface mirror with a mirrored surface is provided instead of a prism-shaped deflecting element.

It is also possible to combine several variants of the embodiments as described herein with each other. Thus, a rotating data transmission device can comprise on one side a collimator arrangement with a deflecting element, and on the other side a collimator arrangement without a deflecting element. Similarly, a single collimator arrangement could comprise a number of collimators with a deflecting element, and a number of collimators without a deflecting element.

The invention claimed is:

1. An optical rotating data transmission device, comprising:
   a first collimator arrangement and a second collimator arrangement rotatable relative to each other about the same rotation axis, and absent a derotating optical element disposed between the first and second collimator arrangements;
   wherein said first collimator arrangement comprises a collimating lens, a deflecting element, and a maximum of one optical waveguide all rigidly connected together; and
   wherein the deflecting element comprises a single reflective surface adapted to deflect a light beam along the rotation axis and along a longitudinal axis of the optical waveguide that extends at a non-zero angle relative to the rotation axis.

2. The optical rotating data transmission device according to claim 1, further comprising a lens support coupled between the collimating lens and the optical waveguide.

3. The optical rotating data transmission device according to claim 2, wherein the lens support comprises opposed planar surfaces on which the collimating lens is coupled to one of the opposed planar surfaces and the optical waveguide is coupled to the other.

4. The optical rotating data transmission device according to claim 1, wherein the rotation axis extends along a longitudinal axis of the optical rotating transmission device.

5. The optical rotating data transmission device according to claim 1, wherein the single reflective surface is configured internal to the deflecting element.

6. The optical rotating data transmission device according to claim 1, wherein the single reflective surface is configured on an external surface of the deflecting element.

7. The optical rotating data transmission device according to claim 1, wherein the rotation axis is orthogonal to the longitudinal axis.

8. The optical rotating data transmission device according to claim 1, wherein the rotation axis is in the range of 30 degrees to 150 degrees relative to the longitudinal axis.

9. The optical rotating data transmission device according to claim 1, wherein the longitudinal axis is measured approximately near the distal end of the optical waveguide proximal the collimating lens.

10. The optical rotating data transmission device according to claim 1, further comprising:
    a second collimating lens and no more than one second optical waveguide coupled together within said second collimator arrangement; and
    a longitudinal axis of the second optical waveguide, measured near the distal end of the second optical waveguide proximal the second collimating lens, is at a non-zero angle relative to the rotation axis.

11. The optical rotating data transmission device according to claim 1, further comprising:
    a second collimating lens and no more than one second optical waveguide coupled together within said second collimator arrangement; and
    a longitudinal axis of the second optical waveguide, measured near the distal end of the second optical waveguide proximal the second collimating lens, is along the rotation axis.

12. The optical rotating data transmission device according to claim 1, further comprising:
    a second collimating lens and no more than one second optical waveguide coupled together within said second collimator arrangement;
    a longitudinal axis of the second optical waveguide, measured near the distal end of the second optical waveguide proximal the second collimating lens, is along the rotation axis;
    wherein a light beam transmitted from the second collimating lens travels along the rotation axis and is deflected by the deflecting element at the non-zero angle onto the optical waveguide; and
    wherein a light beam transmitted from the first collimating lens travels along the rotation axis and onto the second optical waveguide.

13. The optical rotating data transmission device according to claim 1, further comprising:
    a second collimating lens and no more than one second optical waveguide coupled together within said second collimator arrangement;
    a longitudinal axis of the second optical waveguide, measured near the distal end of the second optical waveguide proximal the second collimating lens, is at a non-zero angle relative to the rotation axis;
    wherein a light beam transmitted from the second collimating lens travels along the rotation axis and is deflected by the deflecting element at the non-zero angle onto the optical waveguide; and
    wherein a light beam transmitted from the first collimating lens travels along the rotation axis and is deflected by a second deflecting element coupled to the second collimating lens and the second optical waveguide at a non-zero angle onto the second optical waveguide.

* * * * *